United States Patent
Imes et al.

(10) Patent No.: US 6,508,277 B1
(45) Date of Patent: Jan. 21, 2003

(54) FLEXIBLE PIPE WITH COMPRESSED ENDS

(75) Inventors: Julian A. Imes, Bloomington, MN (US); Wayne M. Wagner, Apple Valley, MN (US); John T. Herman, Dellwood, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/362,079

(22) Filed: Jul. 27, 1999

(51) Int. Cl.$^7$ ................................................ F16L 33/26
(52) U.S. Cl. ........................ 138/135; 138/109; 138/177
(58) Field of Search ............................... 138/135, 109, 138/118, 177, 178

(56) References Cited

U.S. PATENT DOCUMENTS

| | | | |
|---|---|---|---|
| 1,530,324 A | 3/1925 | Pribil ..................... 138/135 X |
| 1,580,760 A | 4/1926 | Palmer ................... 138/135 X |
| 1,596,215 A | 8/1926 | Palmer ................... 138/135 X |
| 2,420,153 A | * | 5/1947 | Sprenger et al. ........ 138/135 X |
| 3,085,596 A | 4/1963 | Rejeski ....................... 138/131 |
| 3,251,612 A | 5/1966 | Webbe ......................... 285/47 |
| 3,348,629 A | 10/1967 | Cassel ........................ 181/232 |
| 3,508,770 A | 4/1970 | Cassel ........................ 285/189 |
| 3,525,419 A | 8/1970 | Cassel ........................ 181/212 |
| 3,572,778 A | 3/1971 | Cassel ........................ 285/382 |
| 3,574,358 A | 4/1971 | Cassel ........................ 285/53 |
| 3,645,357 A | 2/1972 | Cassel ........................ 181/227 |
| 3,653,696 A | 4/1972 | Cassel ........................ 285/403 |
| 3,682,203 A | 8/1972 | Foti et al. ................... 138/135 |
| 3,730,293 A | 5/1973 | Cassel ..................... 138/37 X |
| 3,827,733 A | 8/1974 | Cassel ..................... 285/382.2 |
| 3,863,964 A | 2/1975 | Cassel ........................ 285/382 |
| 3,905,623 A | 9/1975 | Cassel ........................ 285/382 |
| 3,944,265 A | 3/1976 | Hiemstra et al. ............ 285/419 |
| 4,056,273 A | 11/1977 | Cassel ........................ 285/337 |
| 4,113,289 A | 9/1978 | Wagner et al. .............. 285/322 |
| 4,142,743 A | 3/1979 | McGowen et al. ....... 285/148.2 |
| RE30,042 E | 7/1979 | Hiemstra et al. ............ 285/419 |
| 4,261,600 A | 4/1981 | Cassel ...................... 285/148.2 |
| 4,270,689 A | 6/1981 | Canfield ..................... 228/152 |

(List continued on next page.)

FOREIGN PATENT DOCUMENTS

| DE | 2734983 | * 2/1979 | ................. 138/135 |
|---|---|---|---|
| EP | 0 289 815 A1 | 11/1988 | |
| EP | 0 289 815 B1 | 8/1990 | |

*Primary Examiner*—Patrick Brinson

(57) ABSTRACT

The present disclosure relates to a flexible pipe including a pipe body that extends along a central longitudinal axis. The pipe body is made from a strip that is helically wrapped in a plurality of convolutions. The strip includes inner and outer hook portions that interlock to form an interlock seam between adjacent convolutions. The pipe body includes a mid-portion positioned between first and second end portions. At least the first end portion has an axial length $L_1$ that traverses at least several of the convolutions of the pipe body. The first end portion is crushed radially inward relative to the mid-portion such that the first end portion has an effective outer diameter $D_1$ that is smaller than an effective outer diameter $D_2$ of the mid-portion. A first transition region is positioned between the first end portion and the mid-portion. The first transition region provides a diameter transition between the outer diameter $D_1$ of the first end portion and the outer diameter $D_2$ of the mid-portion. The first transition region has an axial length $L_2$ that traverses at least one of the convolutions of the pipe.

14 Claims, 10 Drawing Sheets

U.S. PATENT DOCUMENTS

| | | | |
|---|---|---|---|
| 4,312,526 A | 1/1982 | Cassel | 285/419 |
| 4,466,642 A | 8/1984 | Tonchen | 285/419 |
| 4,536,019 A | 8/1985 | Quaranta | 285/322 |
| 4,558,891 A | 12/1985 | Wagner et al. | 285/322 |
| 4,609,213 A | 9/1986 | Tonchen | 285/419 |
| 4,623,164 A | 11/1986 | Cassel et al. | 280/124.1 |
| 4,629,226 A | 12/1986 | Cassel et al. | 285/382 |
| 4,660,862 A | 4/1987 | Cassel et al. | 285/114 |
| 4,790,574 A | 12/1988 | Wagner et al. | 285/419 |
| 4,813,720 A | 3/1989 | Cassel | 285/419 |
| 5,116,083 A | 5/1992 | Gillingham et al. | 285/23 |
| 5,310,158 A | 5/1994 | Cassel | 248/74.3 |
| 5,588,680 A | 12/1996 | Cassel et al. | 285/382 |
| 5,601,893 A | 2/1997 | Strassel et al. | 138/118 X |
| 5,632,513 A | 5/1997 | Cassel | 285/322 |
| 5,924,282 A | 7/1999 | Thomas | 285/903 X |
| 6,123,369 A | 9/2000 | Wagner et al. | 285/424 |
| 6,125,889 A * | 10/2000 | Elsasser et al. | 138/135 |

* cited by examiner

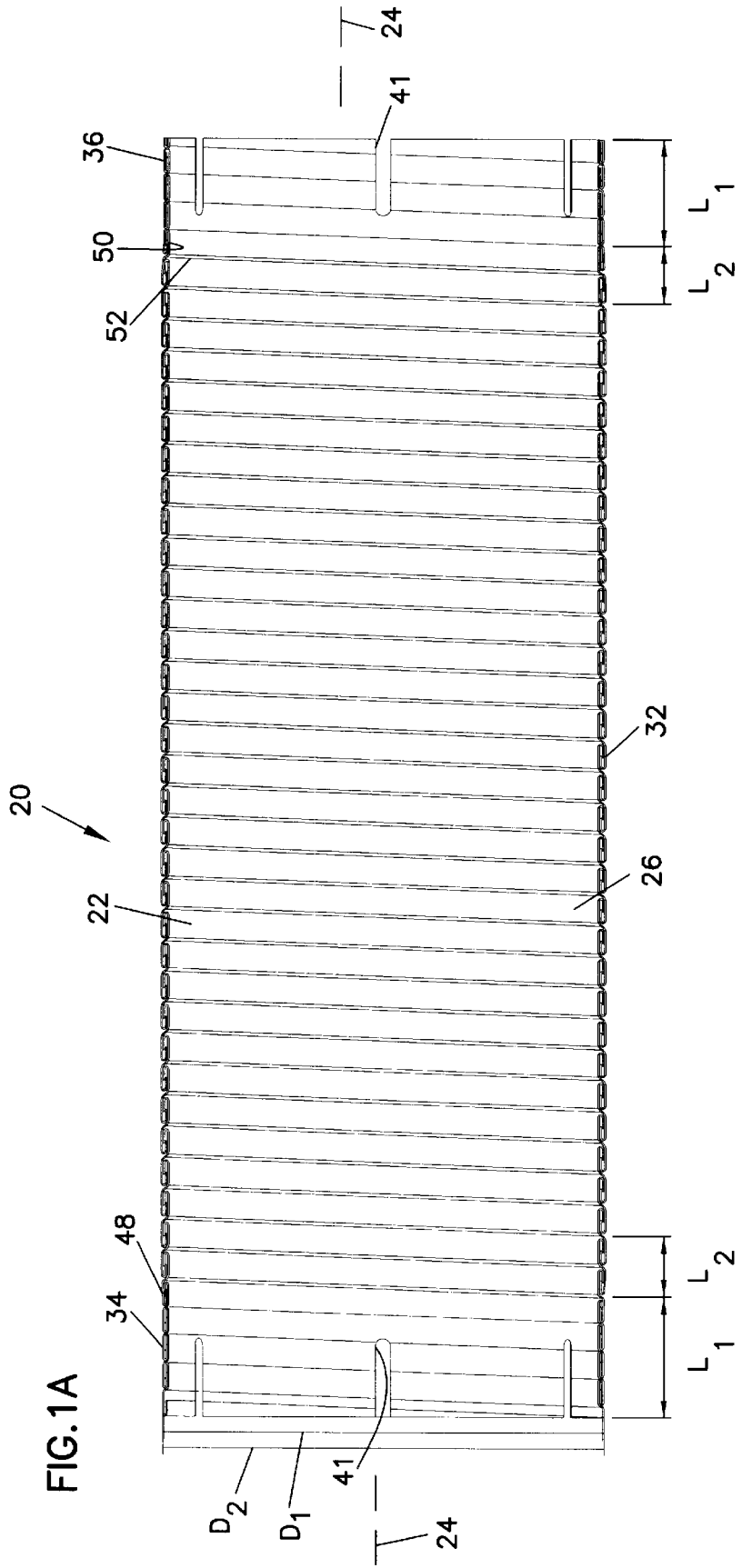

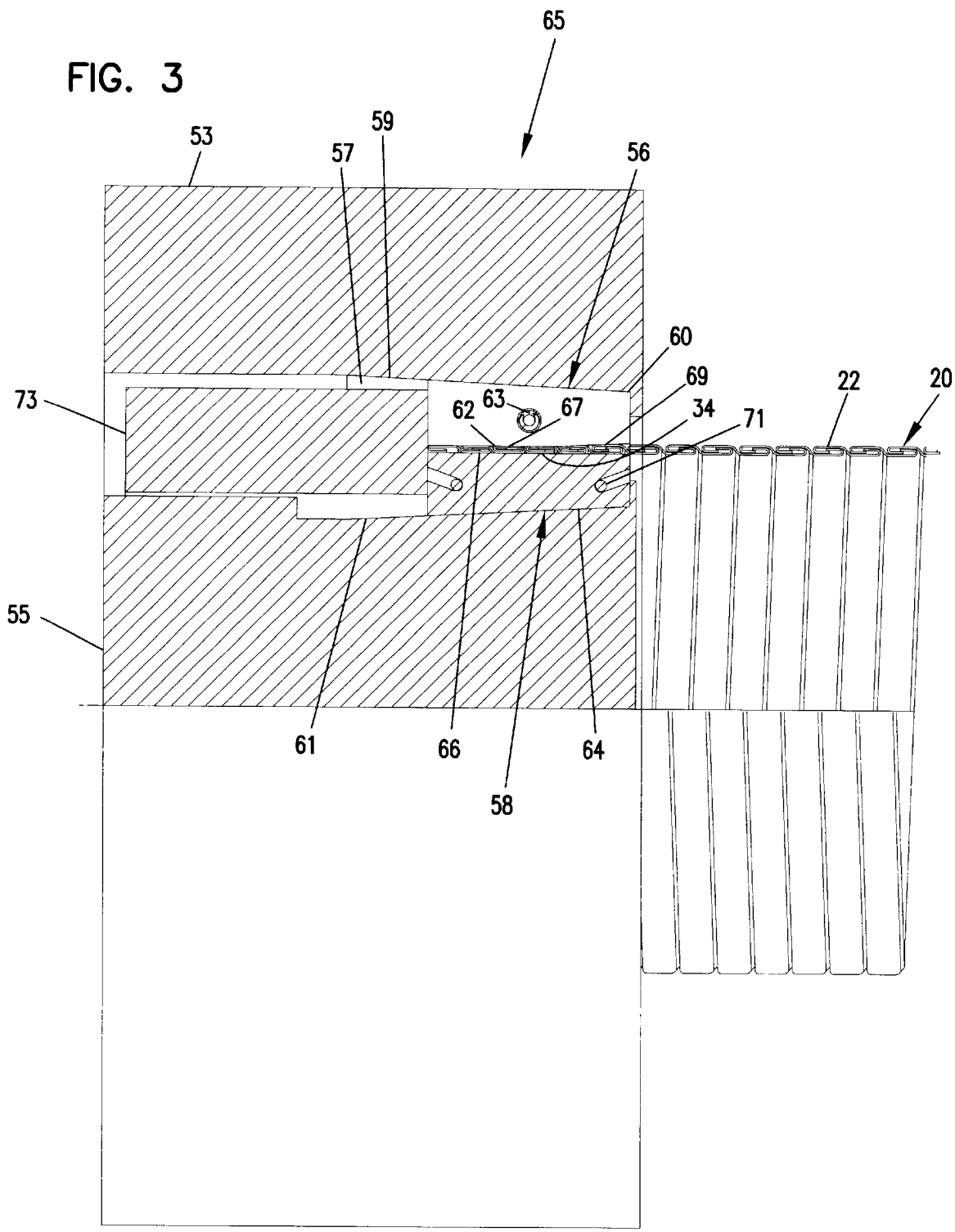

FLEXIBLE PIPE WITH COMPRESSED ENDS

FIELD OF THE INVENTION

The present invention relates generally to flexible exhaust pipes. More particularly, the present invention relates to flexible pipes for use in vehicular exhaust systems.

BACKGROUND OF THE INVENTION

Strip wound flex pipe, also known as flex hose or flex tube, has been in existence for over 100 years. Some common uses for strip wound flex pipe include flexible electrical conduit, flexible pneumatic pipe and flexible pipe for use in truck exhaust systems.

Typically, flexible pipe is made of a strip of metal having a generally "S" shaped cross section including a first hook portion positioned opposite from a second hook portion. To form a pipe body, the strip of metal is wrapped in a helical pattern. As the strip of metal is wrapped in the helical pattern, the first and second hook portions of adjacent helical wraps are interlocked to form pivotal interlock seams of the pipe body. Typical metals used in manufacturing flexible pipe include galvanized steel, aluminized steel, and stainless steel.

A flexible pipe segment used in a truck exhaust system is subjected to a very harsh, destructive environment. Hence, flexible pipes in truck exhaust systems are more likely to fail sooner than flexible pipes used in less harsh environments such as electrical or pneumatic applications. Common causes of flexible pipe failure in truck exhaust systems include: (1) heat; (2) vibration; (3) displacement from frame twist and engine motor mount flexing; (4) corrosion and carbon contamination; and (5) wear.

Engine heat causes thermal expansion of the flexible pipe incorporated within an exhaust system. A new piece of flexible pipe has sufficient flexibility to inhibit thermal stresses on the exhaust system parts. Unfortunately, heat causes the flexible pipe to grow progressively more rigid with age. Consequently, older flexible pipe is subject to breakage due to thermal expansion/contraction.

Vibrations causing damage to flexible pipes in vehicle exhaust systems are commonly caused by engine vibrations and pressure pulsations in the exhaust gas flow. Such vehicular vibrations cause slight relative movement between the individual wraps of the flexible pipe. The relative movement between adjacent convolutions of the pipe causes the convolutions to rub against one another and abrade the flexible pipe.

Displacement of exhaust system piping is produced primarily when a vehicle is shifting gears, or when the vehicle frame is twisted by impacts to the frame such as road bumps. Twisting of the vehicle frame produces bending moments on the exhaust system piping and muffler that can cause breakage. Changes in torque associated with shifting gears can also cause vehicle engines to displace in their mounts thereby causing exhaust piping connected to the engines to be displaced. New flexible piping can readily absorb the movement associated with frame twist or engine torque motion. However, such movement can cause breakage of older, less flexible pipes.

Corrosion and carbon contamination also are responsible for flexible pipe failure. Depending on the choice of metal, exterior corrosion of a piece of flexible pipe is typically caused by rain, snow, and road salt. As the outside of the flexible pipe corrodes, the individual convolutions or wrapped segments become rigid with respect to one another. Heat can also cause corrosion or scaling of the metal. Carbon produced by diesel engines, along with the products of combustion such as weak acid, can further cause internal deterioration and inflexibility of flexible piping.

It The various factors mentioned above all contribute to flexible pipe failure. Typically, wear failure is caused by a combination of the above factors. For example, often a segment of flexible pipe becomes inflexible forcing all motion to be concentrated on one convolution of the flexible pipe segment. Frequently, the one convolution is located in the center of the segment. This, in turn, causes excessive motion and forces on the center of the segment which cause the flexible pipe to break at the center. Alternatively, a bending moment can be greatest at an end of a piece of flexible pipe causing the tubing to break adjacent to the clamp.

SUMMARY OF THE INVENTION

One aspect of the present invention relates to a flexible pipe adapted to be used in a vehicular exhaust system. The flexible pipe includes a pipe body that extends longitudinally along a central axis. The pipe body is made from a strip that is helically wrapped in a plurality of convolutions. The strip includes inner and outer hook portions that interlock to form an interlock seam between adjacent convolutions. The pipe body includes a flexible mid-portion positioned between first and second end portions. At least the first end portion has an axial length $L_1$ that traverses at least several of the convolutions of the pipe body. Along the axial length $L_1$, the first end portion defines an outer diameter $D_1$. The mid-portion of the pipe body has an outer diameter $D_2$. The first end portion is crushed radially inward relative to the mid-portion such that the outer diameter $D_1$ is smaller than the outer diameter $D_2$. The flexible pipe further includes a first transition region positioned between the first end portion and the mid-portion. The first transition region provides a diameter transition between the outer diameter $D_1$ of the first end portion and the outer diameter $D_2$ of the mid-portion. The first transition region has an axial length $L_2$ that traverses at least one of the convolutions of the pipe.

The present invention provides numerous advantages. For example, the crushed first end inhibits circumferential slippage and leakage at the first end portion. Also, because the first end portion is crushed, the flexible pipe can be connected to an exhaust system by a variety of techniques such as welding, wide band clamps or narrow band clamps. Furthermore, also because the first end portion of the flexible pipe is crushed, conventional spot welds or tack welds that are typically placed at the end of a flexible pipe when the pipe is cut off can be eliminated. Moreover, because the crushed first end portion resists circumferential slippage, either standard open ended slots or captured slots can readily be used at the first end portion.

The transition region between the first end portion and the mid-portion also provides significant advantages. For example, when the flexible pipe is connected to a non-flexible pipe (e.g., a conventional solid-walled pipe), the non-flexible pipe is inserted within the flexible pipe to form a lap joint. Preferably, the non-flexible pipe is inserted within the flexible pipe such that an end of the non-flexible pipe terminates at the transition region. A clamp is then typically placed over the lap joint. During use of the exhaust system, the transition region distributes the flexible motion of the flexible pipe that would otherwise occur directly adjacent to the clamp. In this manner, the transition region assists in lengthening the useful life of the flexible pipe by inhibiting premature failure at the location immediately adjacent to the clamp. The transition region also facilitates forming a lap joint by providing additional clearance for inserting the non-flexible pipe within the flexible pipe. While the transition region provides clearance for facilitating forming the lap joint, the crushed end portion insures that an effective seal is formed at the lap joint.

A variety of additional advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 1A is a longitudinal cross sectional view of a flexible pipe constructed in accordance with the principles of the present invention;

FIG. 3 is a longitudinal cross sectional view of the compression tool of FIG. 2A after the pipe has been compressed by the compressing tool;

DETAILED DESCRIPTION

Reference will now be made in detail to various aspects of the present invention that are illustrated in the accompanying drawings. Wherever possible, the same reference numbers will be used throughout the drawings to refer to the same or like parts.

Figure 1B:
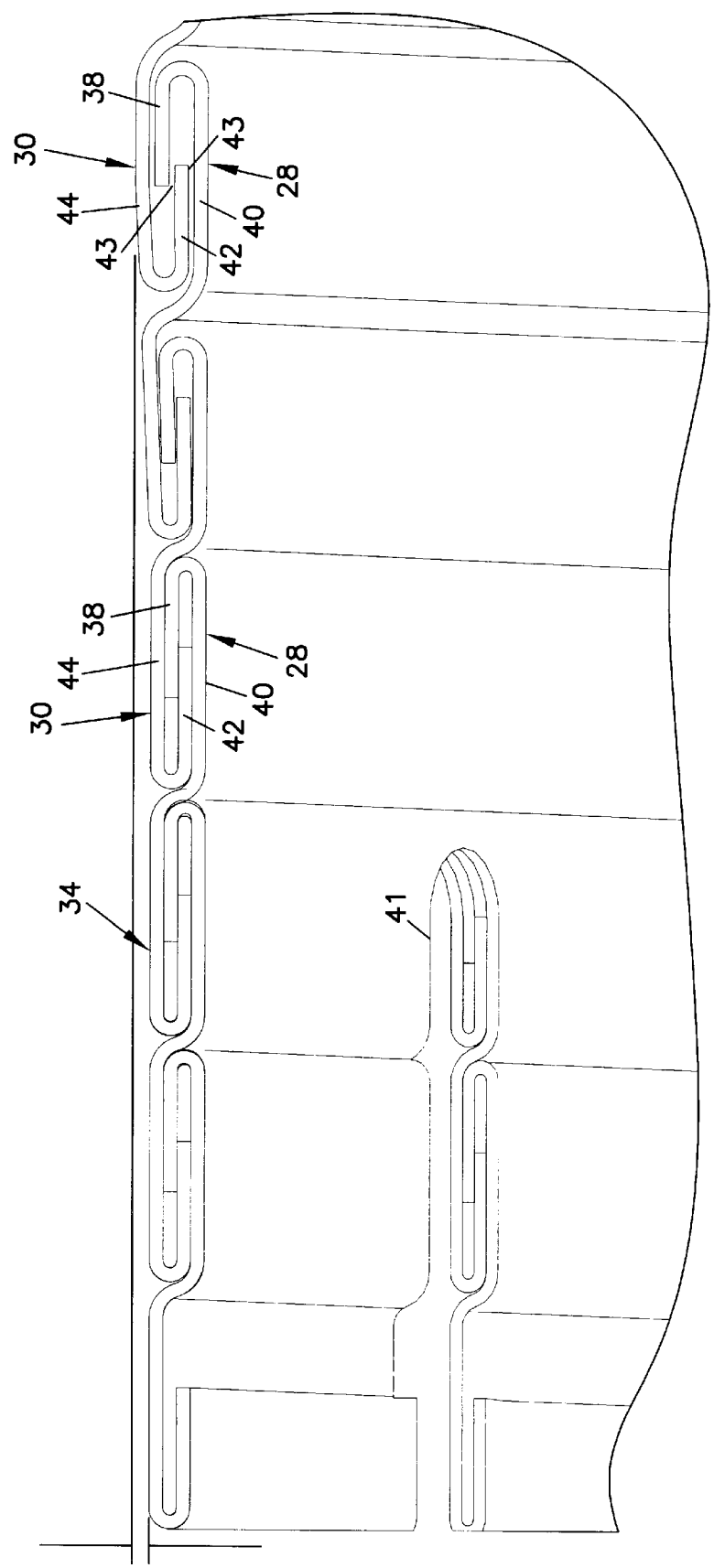
FIG. 1B is a detailed view of a portion of the flexible pipe of FIG. 1A.

FIG. 1A illustrates a flexible pipe 20 constructed in accordance with the principles of the present invention. The flexible pipe 20 includes a pipe body 22 that extends along a central longitudinal axis 24. The pipe body 22 is made from a strip 26 that is helically wrapped in a plurality of convolutions. As best shown in FIG. 1B, the strip includes inner and outer hooks 28 and 30 that interlock to form an interlock seam between adjacent convolutions. The strip 26 is preferably made of a metal material such as steel, aluminized steel, or stainless steel.

As used in this specification, the term "convolution" is intended to mean a 360° wrap or coil of the strip 26. Preferably, the flexible pipe 20 has about 25–40 convolutions per linear foot of pipe.

Referring again to FIG. 1A, the pipe body 22 includes a flexible mid-portion 32 positioned between first and second end portions 34 and 36. The first and second end portions 34 and 36 each have an axial length $L_1$ that traverses at least several of the convolutions of the pipe body 22. For example, as shown in FIG. 1A, each axial length $L_1$ traverses about four convolutions.

The convolutions of the first and second end portions 34 and 36 are preferably crushed radially inward relative to the mid-portion 32 such that the first and second end portions 34 and 36 have outer diameters $D_1$ that are smaller than an outer diameter $D_2$ of the mid-portion 32. Also, each of the end portions 34 and 36 has a wall thickness $T_1$ that is smaller than a wall thickness $T_2$ of the mid-portion 32. As shown in FIG. 1A, the outer diameters $D_1$ are defined by the outer cylindrical surfaces of the convolutions that form the end portions 34 and 36, and the outer diameter $D_2$ is defined by the outer cylindrical surfaces of the convolutions forming the mid-portion 32. Preferably, the outer diameters $D_1$ are generally constant along the first and second end portions 34 and 36, and the outer diameter $D_2$ is substantially constant along the mid-portion 32.

Referring now to FIG. 1B, each of the inner hooks 28 includes a free end portion 38 and a base end portion 40. Similarly, each of the outer hooks 30 includes a free end portion 42 and a base end portion 44. The free end portions 38 of the inner hooks 28 are interleaved between the free and base end portions 42 and 44 of the outer hooks 30. The free end portions 42 of the outer hooks 30 are interleaved between the free and base end portions 38 and 40 of the inner hooks 28.

At the first and second end portions 34 and 36 of the pipe body 22, the inner and outer hooks 28 and 30 are compressed into engagement with one another such that no gaps are formed between the interleaves of the hooks 28 and 30. For example, no gaps are formed between: (a) the base end portions 44 of the outer hooks 30 and the free end portions 38 of the inner hooks 28; (b) the free end portions 38 of the inner hooks 28 and the free end portions 42 of the outer hooks 30; and (c) the free end portions 42 of the outer hooks 30 and the base end portions 40 of the inner hooks 28. As best shown in FIG. 1B, at the end portions 34 and 36 of the pipe body 22, the free and base end portions 38–44 of the inner and outer hooks 28 and 30 are compressed into parallel contact with one another.

At the mid-portion 32, gaps 43 are formed between the interleaves of the inner and outer hooks 28 and 30. The gaps 43 allow the mid-portion 32 to be moved between an axially extended position and an axially compressed position. As the mid-portion 32 is axially extended, each set of interlocking inner and outer hooks 28 and 30 slide toward one another. By contrast, when the mid-portion 32 is axially compressed, each set of interlocking inner and outer hooks 28 and 30 move away from one another. As shown in FIGS. 1A and 1B, the mid-portion 32 is in a fully axially compressed orientation. The spacing between the inner and outer hooks 28 and 30 also allows the mid-portion 32 to be laterally flexed.

Because the first and second end portions 34 and 36 have been crushed to remove the gaps 43, the end portions 34 and 36 are substantially less flexible than the mid-portion 32. Furthermore, the first and second end portions 34 and 36 are permanently retained (e.g., by friction) in a fully axially compressed orientation. The phrase "permanently retained" is intended to mean that when an axial tension is applied to the pipe body 22, the mid-portion 32 will fully axially expand and fail before any axial movement is generated between the inner and outer hooks 28 and 30 of the end portions 34 and 36.

Each of the first and second end portions 34 and 36 also preferably defines a plurality of open take-up slots 41. The take-up slots 41 facilitate clamping the end portions 34 and 36 at lap joints. In one embodiment, about 4 to 6 take-up slots 41 are provided at each of the end portions 34 and 36. Preferably, the open take-up slots 41 are punched through the end portions 34 and 36 (e.g., with a multi-bladed die) after the end portions 34 and 36 have been crushed radially inward while in the fully axially compressed orientation.

The crushed configuration of the end portions 34 and 36 provides numerous advantages over the prior art. For example, by crushing the end portions 34 and 36 radially inward, leakage gaps between the convolutions are reduced or eliminated. Furthermore, the crushed configuration prevents circumferential slippage between adjacent convolutions of the end portions 34 and 36. Circumferential slippage, as described in U.S. Pat. No. 5,632,513 to Cassel, involves circumferential sliding or movement between adjacent convolutions of a piece of flex pipe. Circumferential slippage at the ends of the pipe body 22, especially in the region where the take-up slots 41 are located, can allow the end portions 34 and 36 to at least partially detach from the remainder of the pipe body 22. Thus, by preventing circumferential slippage, the crushed configuration assists in maintaining the integrity of the pipe body 22. Moreover, when conventional flex pipe is clamped with a wide band clamp, it is common for several of the thin soft layers of the flexible pipe to pucker into the clamp gap when the clamp is tightened about the flex pipe. However, this problem is prevented by the crushed configuration disclosed herein because the multiple interleaves of the outer and inner hooks 28 and 30 are crushed together to form a single unitary body as opposed to having multiple radially spaced apart and relatively soft layers of metal.

Referring still again to FIGS. 1A and 1B, the pipe body 22 also includes first and second transition regions 48 and 50. The first transition region 48 is positioned between the first end portion 34 and the mid-portion 32, and the second transition region 50 is positioned between the second end portion 36 and the mid-portion 32. The transition regions 48 and 50 provide gradual outer diameter transitions between the outer diameter $D_2$ of the mid-portion 32 and the outer diameters $D_1$ of the end portions 34 and 36. The transition regions 48 and 50 also provide gradual wall thickness transitions between the thickness $T_1$ of the end portions 34 and 36 and the thickness $T_2$ of the mid portion 32. Preferably, each of the transition regions 48 and 50 has an axial length $L_2$ that traverses at least one of the convolutions of the pipe. In one particular embodiment, the length $L_2$ traverses between one to two convolutions of the pipe.

To facilitate aligning exhaust pipes within the flexible pipe 20, a pipe stop 52 is located adjacent to the interface between the transition region 50 and the second end portion 36. The pipe stop 52 projects radially into the central opening defined by the tubular pipe body 22. Preferably, the pipe stop 52 extends radially inward a sufficient distance to act as a stop for engaging exhaust pipes inserted within the second end portion 36 of the flexible pipe 20. It will be appreciated that a pipe stop could also be used adjacent the first end portion 34.

At the transition regions 48 and 50, the clearance between the interleaves of the flexible pipe 20 preferably increase from zero at the end portions 34 and 36 to normal clearance at the mid-portion 32. In a preferred embodiment, the transition regions 48 and 50 each have a generally frusto-conical outer shape. When the flexible pipe 20 is clamped onto an exhaust system, the transitions regions 48 and 50 assist in enhancing the useful life of the pipe 20 by dispersing the flex motion that would otherwise occur directly adjacent to the clamps used to secure the flexible pipe 20 to the system.

Figure 2B:
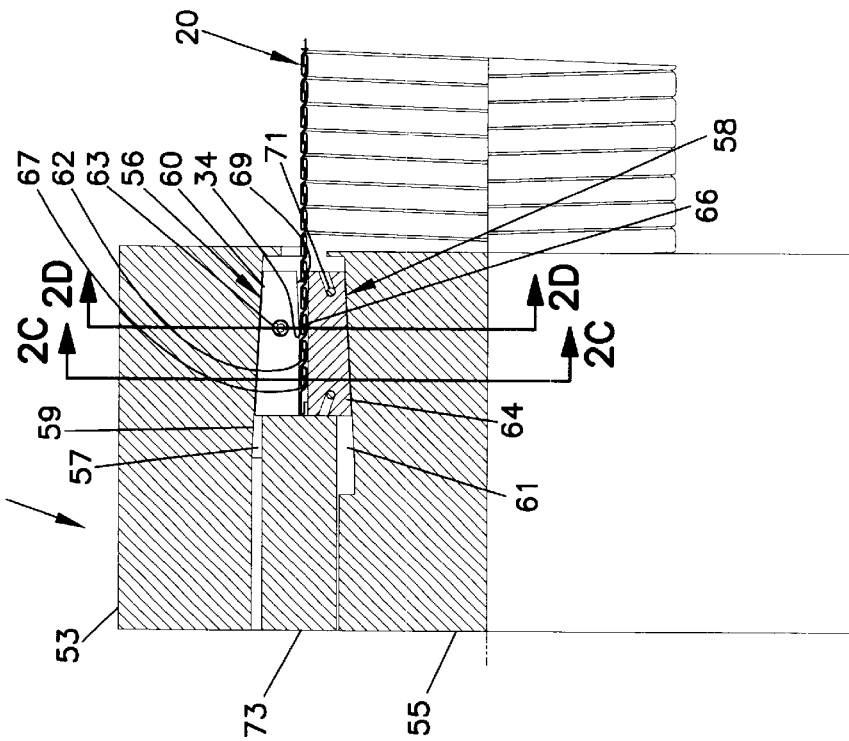
FIG. 2B is a cross-sectional view taken along section line 2B—2B of FIG. 2A, an uncompressed flexible pipe is shown positioned within the tool.
Figure 2A:
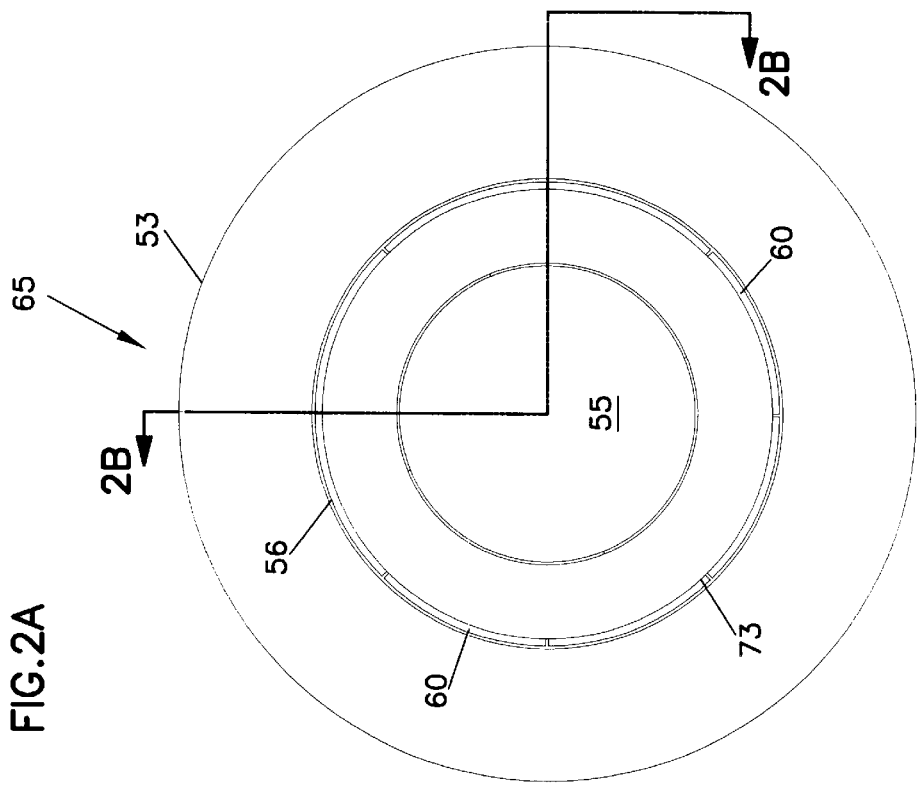
FIG. 2A is an end view of a compression tool adapted for compressing the ends of the flexible pipe of FIG. 1A.

FIGS. 2A–2D and 3 illustrate a compression/sizing tool 65 for pre-compressing the end portions 34 and 36 of the flexible pipe 20. For the purposes of this specification, the term "pre-compress" is intended to mean that the end portions are compressed during a manufacturing process before the flexible pipe 20 has been clamped or otherwise used in an exhaust system. As shown in FIGS. 2B and 3, the first end portion 34 of the pipe 20 is shown inserted within the tool 65. It will be appreciated that the sizing tool 65 is preferably used to crush/compress the second end portion 36 of the flexible pipe 20. For clarity, the pipe 20 is not shown in FIGS. 2C or 2D.

Referring to FIG. 2B, the sizing tool 65 includes a housing having an outer sleeve 53 positioned around an inner core 55. An annular gap 57 is defined between the outer sleeve 53 and the inner core 55. For example, the annular gap 57 is defined between a first surface 59 formed on the outer sleeve 53 and a second surface 61 formed on the inner core 55. The first and second surfaces 59 and 61 preferably incline toward one another such that the annular gap 57 has a radial width that progressively narrows. As shown in FIGS. 2B and 3, the radial width of the gap 57 progressively narrows as the gap 57 extends in a rightward direction.

Figure 2C:
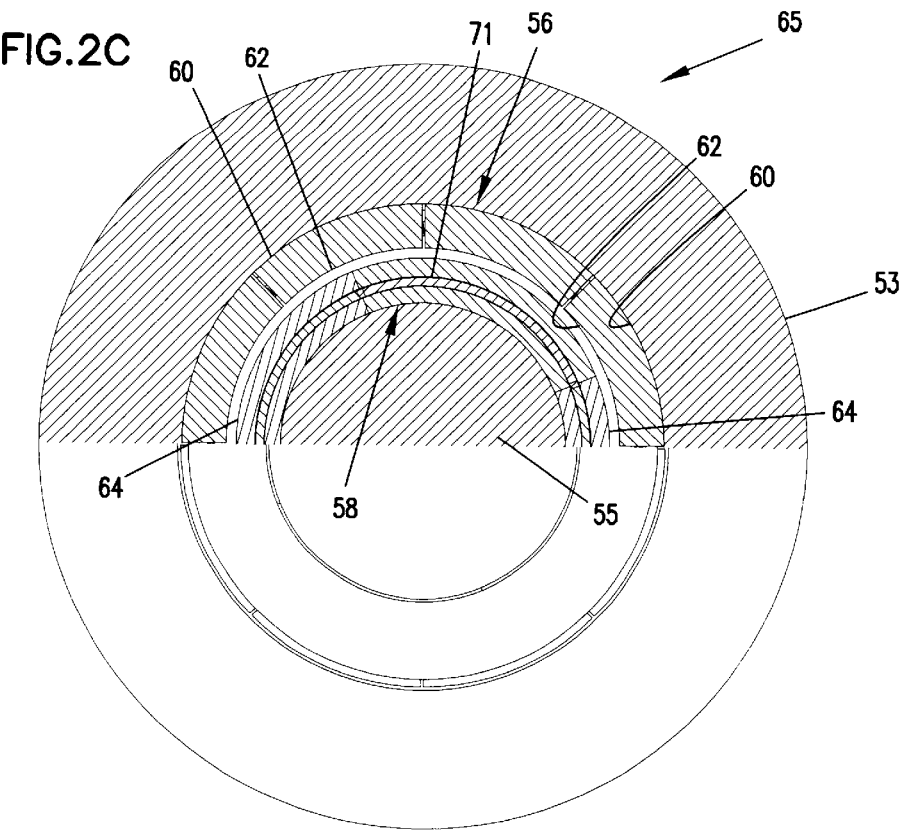
FIG. 2C is a cross-sectional view taken along section line 2C—2C of FIG. 2B.
Figure 2D:
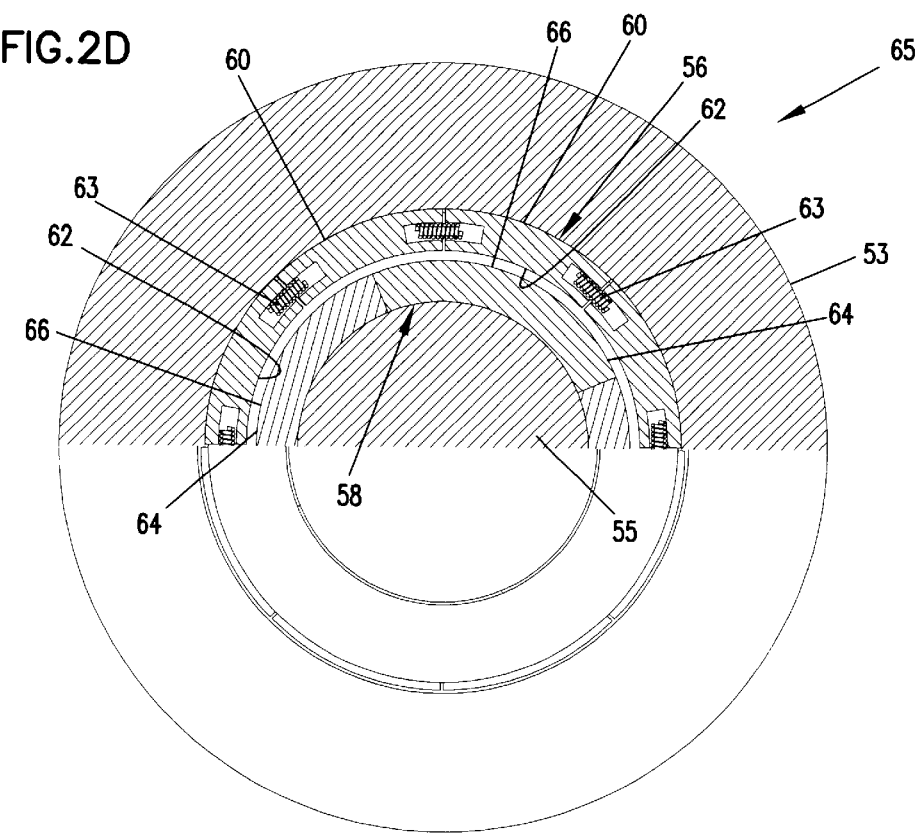
FIG. 2D is a cross-sectional view taken along section line 2D—2D of FIG. 2B.

A compression mechanism is positioned within the annular gap 57. The compression mechanism includes a sizing collet 58 mounted on the inner core 55, and a compression collet 56 positioned between the sizing collet 58 and the outer sleeve 53. The compression collet 56 includes a plurality of collet members 60 having curved inner compression surfaces 62 (shown in FIGS. 2C and 2D) that face radially inward. As shown in FIG. 2D, the collet members 60 are preferably biased toward an open position (i.e., biased away from one another) by a plurality of springs 63. The sizing collet 58 also includes a plurality of separate collet members 64. The collet members 64 include outer curved sizing surfaces 66 that face radially outward. As shown in FIGS. 2B and 2C, the collet members 64 are held together by a pair of o-rings 71.

As best shown in FIGS. 2B and 3, the compression surfaces 62 define a generally cylindrical portion 67 and a tapered portion 69. The tapered portion 69 tapers radially outward from the cylindrical portion 67. The tapered portion 69 has a generally frusto-conical shape and is used to provide the gradual reduction in compression located at the transition regions 48 and 50 of the pipe body 22.

To manufacture a piece of flex pipe, a strip of metal is first bent into a generally S-shaped configuration so as to define the first and second hooks 28 and 30. The strip is then helically wound and the hooks 28 and 30 are concurrently interlocked to form a continuous length of flex pipe. To manufacture flex pipes of given lengths, the continuous length of flex pipe is cut at predetermined lengths. If the pipes are cut with a saw, the convolutions at the cut ends of the pipes have a tendency to circumferentially slip relative to one another. For example, with each cut, one of the cut ends has a tendency to "wrap" open thereby increasing the inner diameter of that end, while the other end has a tendency to "wrap down" thereby decreasing the inner diameter of that end. This type of circumferential slippage is typically caused by the inherent spring force present in the helically wound strip. To prevent this type of slippage, it is preferred to laser cut or plasma cut the pieces of flex pipe. By laser or plasma cutting the pipe, the convolutions adjacent to the cut are welded together during the cutting process such that slippage is inhibited.

After the pipe body 22 has been cut, the sizing tool 65 is used to compress or crush the end portions 34 and 36 of the pipe body 22. To crush the first end portion 34, the first end portion 34 is preferably initially moved to a fully axially compressed orientation (as shown in FIG. 2B). Next, the first end portion 34 is inserted between the sizing collet 58 and the compression collet 56 as shown in FIG. 2B. The compression mechanism is then moved in a rightward direction (e.g., by annular ram 73). As the compression mechanism is moved to the right, the decreasing radial width of the gap 57 causes the sizing collet 58 to expand and the compression collet 56 to contracts.

FIG. 2B shows the compression mechanism in an open orientation and FIG. 3 shows the compression mechanism in a compressed orientation. At the compressed orientation, the sizing surfaces 66 of the sizing collet 58 define a cylindrical outer boundary having a diameter that corresponds to a desired inner diameter of the first end portion 34. Also at the compressed orientation, the space between the sizing collet 58 and the compression collet 56 is sufficiently small that the first end portion 34 and the transition region 48 are radially crushed between the collets 56 and 58.

Preferably, the compression collet 56 provides sufficient radial compression force to fully close the gaps from between the interleaves of inner and outer hooks at the first end portion 34. The sizing collet 58 is preferably sufficiently rigid to not deform during the compression process. Thus, the size of the compressed inner diameter of the end portion 34 of the pipe 20 is precisely controlled. This is significant because, as described above, circumferential slippage during the manufacturing process can cause the ends of a piece of flexible pipe to have different inner diameters. However, using the compression process described above, the ends of the flex pipe will have precisely controlled inner diameters even if circumferential slippage occurred during the initial manufacturing process. After compression, the diameters of the end portions will not change because friction prevents circumferential slippage at the end portions.

After compression, the compression mechanism is moved to the open Ti orientation of FIG. 2B and the first end portion 34 is removed from the sizing tool 65. Thereafter, the same compression process can be used to crush the second end portion 36 of the pipe body 22.

Figure 4A:
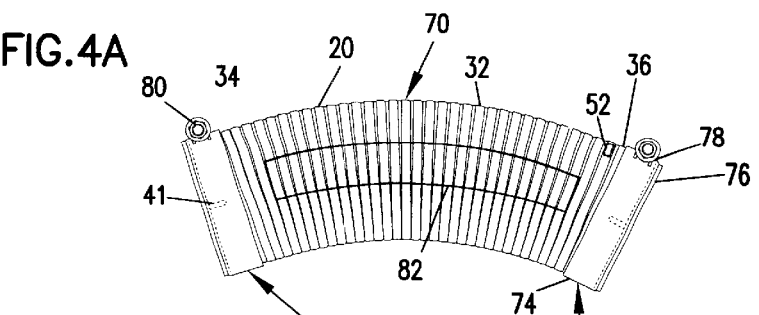
FIGS. 4A–4E illustrate a plurality of steps for installing a flexible pipe module in accordance with the principles of the present invention.

FIG. 4A illustrates a flexible pipe module 70 constructed in accordance with the principles of the present invention. The flexible pipe module 70 includes the flexible pipe 20.

Clamps 72 are mounted at the first and second end portions 34 and 36 of the pipe 20. For transportation purposes, the clamps 72 are preferably connected to the ends of the flexible pipe 20 by conventional techniques such as spot welds.

As shown in FIG. 4A, each of the clamps 72 includes an enlarged diameter portion 74 connected to a reduced diameter portion 76 by a radial instep 78. The enlarged diameter portions 74 and the reduced diameter portions 76 define cylindrical sealing surfaces. The enlarged diameter portions 74 have greater axial lengths than the reduced diameter portions 76. Preferably, the axial lengths of the enlarged diameter portions 74 are selected such that the enlarged diameter portions 74 completely cover the take-up slots 41 of the flexible pipe 20. Each clamp 72 has a single bent bolt 80 that is used to tighten both the reduced diameter portions 76 and the enlarged diameter portions 74. As mounted on the flexible pipe 20, the radial insteps 78 preferably abut against the ends of the first and second end portions 34 and 36. Further details concerning the clamps 72 are disclosed in U.S. Pat. No. 6,305,054 which issued Oct. 23, 2001, which is entitled Exhaust System Clamp, and which is hereby incorporated by reference.

During installation, it is preferred for the flexible pipe 20 to be installed in the half compressed state to allow optimal flexing. For example, it is preferred for the mid-portion 32 to be positioned at an axial orientation about halfway between the fully extended axial orientation and the fully compressed axial orientation. Preferably, a compression indicator 82 is used to give an indication of the relative compression of the flexible pipe 20. In a preferred embodiment, the compression indicator 82 comprises a piece of tape, such as masking tape. After manufacturing of the flexible pipe 20, the mid-portion 32 is placed in about the half compressed state. The compression indicator 82 is then placed on the mid-portion 32 while the mid-portion 32 is in the half compressed state. During installation, if the compression indicator 82 is wrinkled, it indicates to the user that the flexible pipe 20 is overcompressed. The flexible pipe 20 can be expanded to unwrinkle the compression indicator 82. If the compression indicator 82 is ripped, it indicates to the user that the flexible pipe 20 is expanded beyond the half compressed condition. The flexible pipe 20 can then be compressed to the condition where the ripped ends of the compression indicator 82 are in touching engagement. Further details concerning the compression indicator 82 are disclosed in U.S. Pat. No. 6,123,369 which issued Sep. 26, 2000, which is hereby incorporated by reference.

FIGS. 4A–4E illustrate a method for installing the flexible pipe module 70 between left and right pipes 86 and 88. Each of the left and right pipes 86 and 88 has ends 89 that are bent, curled or curved circumferentially inward. For example, the inward curves can be formed by an end finishing or rolling operation that rounds or bends the outer edges of the pipes 86 and 88 into smoother, less abrasive contours. The removal of the sharp outer edges prevents premature wear on the inside of the flexible pipe and also removes a discrete fulcrum edge for the flexible pipe 20 to be leveraged against when the flexible pipe 20 is flexed in an exhaust system.

Figure 4B:
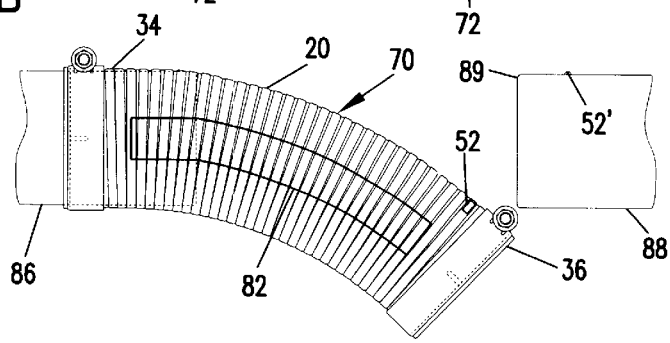
Figure 4C:
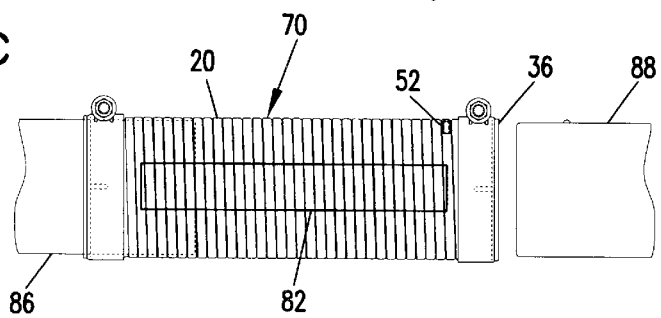
Figure 4D:
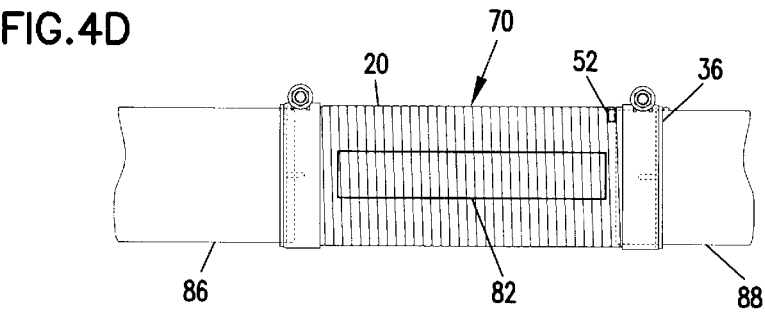
Figure 4E:
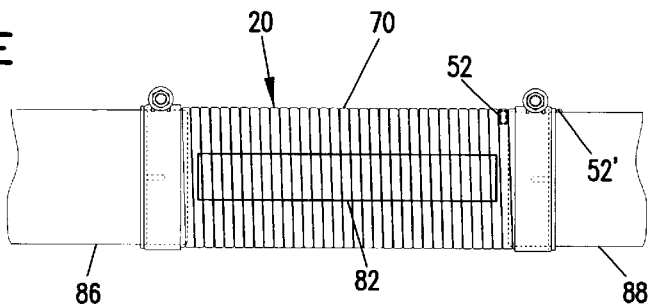

To install the pipe module 70, the pipe 20 is first flexed to its extreme arc as shown in FIG. 4A. Next, the undimpled end (e.g., the first end portion 34) of the flexible pipe 20 is inserted over the left pipe 86 as shown in FIG. 4B. The flexible pipe 20 is then straightened such that the second end portion 36 is brought into coaxial alignment with the right pipe 88 as shown in FIG. 4C. After coaxial alignment has been achieved, the second end portion 36 is slid onto the right pipe 88 until the dimple/pipe stop 52 engages the end of the right pipe 88 as shown in FIG. 4D. With the pipe 88 engaging the pipe stop 52, the right clamp 72 is preferably tightened such that the lap joint formed between the second end portion 36 and the right pipe 88 is effectively secured and sealed. Thereafter, the first end portion 34 of the flexible pipe 20 is stretched tight placing the mid-portion 32 at the half compressed orientation as shown in FIG. 4E. Finally, the left clamp 72 is tightened to secure and seal the lap joint formed between the left pipe 86 and the first end portion 34 of the flexible pipe 20.

While in one embodiment the pipe stop 52 is used to achieve a desired amount of overlap between the flexible pipe 20 and the left and right pipes 86 and 88, it will be appreciated that alternative structures could also be used. For example, out-dents 52' can be formed on the outer surface of at least one of the left and right pipes 86 and 88.

Figure 5:
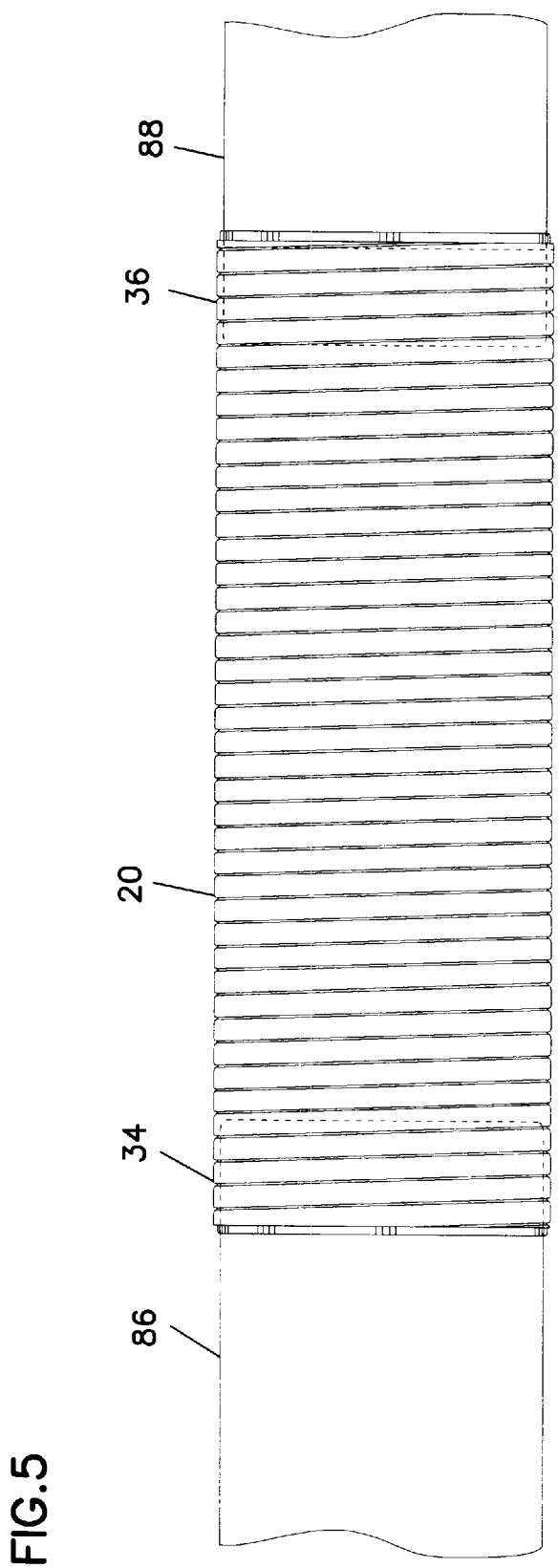
FIG. 5 illustrates a flexible pipe in accordance with the principles of the present invention that provides a connection between two exhaust pipes, the ends of the flexible pipe are welded to the exhaust pipes.

FIG. 5 illustrates the flexible pipe 20 providing a connection between left and right exhaust pipes 86 and 88. In this particular embodiment, lap joints formed between the end portions 34 and 36 of the flexible pipe 20 and the pipes 86 and 88 are secured and sealed by welds.

Figure 6:
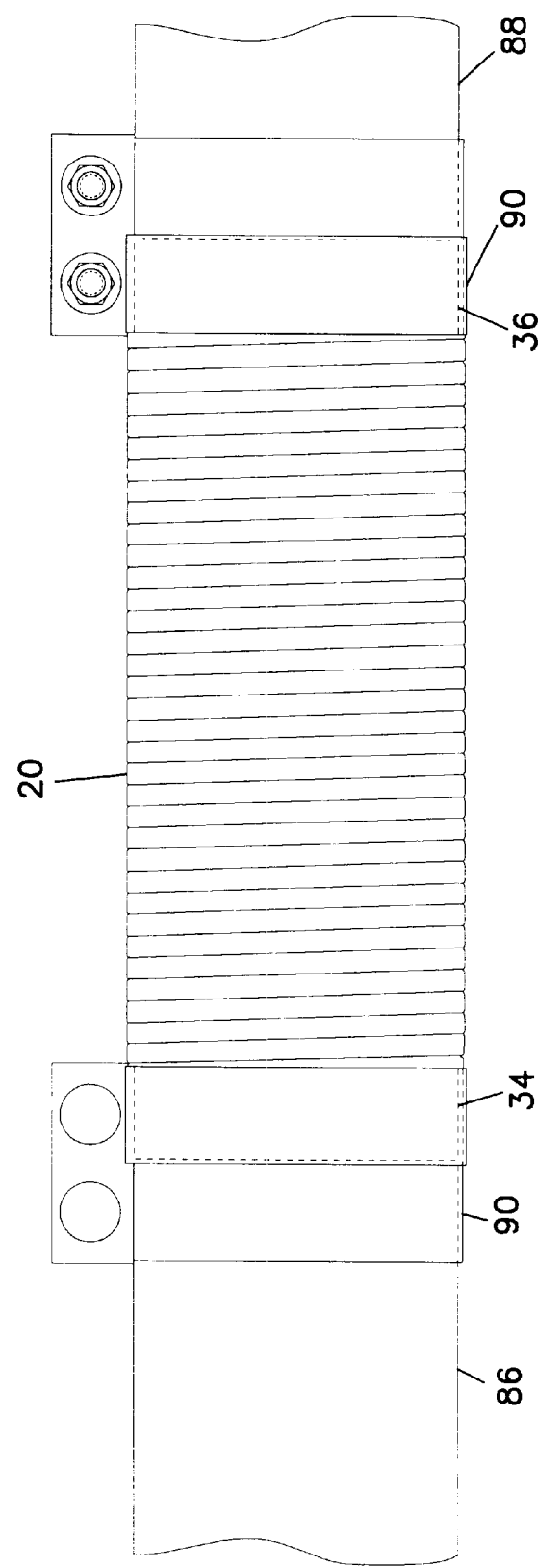
FIG. 6 illustrates a flexible pipe in accordance with the principles of the present invention that provides a connection between two exhaust pipes, the ends of the flexible pipe are connected to the exhaust pipes by wide-band clamps.

FIG. 6 again illustrates the flexible pipe 20 being used to provide a connection between two exhaust pipes 86 and 88. However, in this particular embodiment, generally ductile, wide band clamps 90 are used to secure and seal the lap joints formed between the pipes 86 and 88 and the ends 34 and 36 of the flexible pipe 20.

Figure 7:
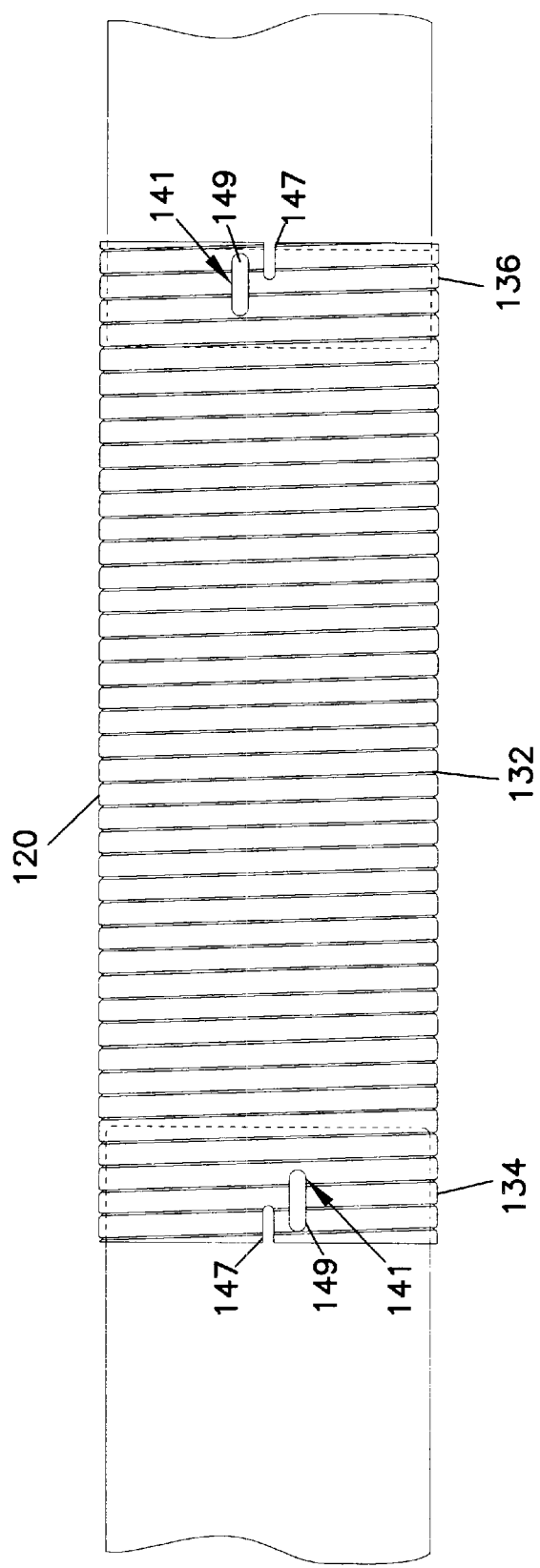
FIG. 7 illustrates an alternative flexible pipe constructed in accordance with the principles of the present invention, the flexible pipe includes captured slots and open-ended slots that overlap one another.

FIG. 7 illustrates an alternative flexible pipe 120 constructed in accordance with the principles of the present invention. Similar to the embodiment of FIGS. 1A and 1B, the flexible pipe 20 has a mid-portion 132 positioned between first and second end portions 134 and 136. The first and second end portions 134 and 136 are compressed radially inward relative to the mid-portion 132. A plurality of take-up slots 141 are formed in the end portions 134 and 136. The take-up slots 146 include generally U-shaped open slots 147 that have been punched through the flexible pipe 120. The end portion 134 and 136 also define captured slots 149 that also have been punched through the pipe 120. Preferably, the open slots 147 and the captured slots 149 axially overlap one another.

Figure 8:
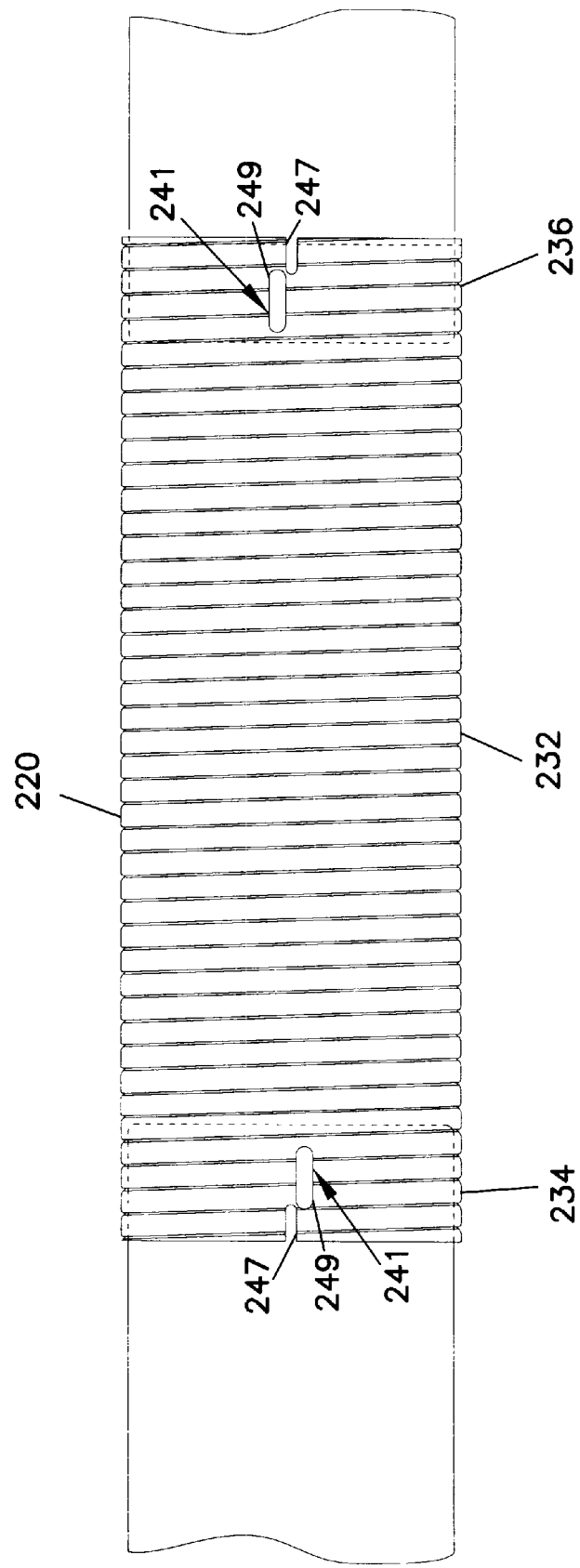
FIG. 8 illustrates a further flexible pipe constructed in accordance with the principles of the present invention, the flexible pipe includes captured slots and open-ended slots that do not overlap one another.

FIG. 8 illustrates another flexible pipe 220 constructed in accordance with the principles of the present invention. Similar to the previous embodiments, the flexible pipe 220 includes a mid-portion 232 position between first and second end portions 234 and 236. The end portions 234 and 236 are compressed radially inward relative to the mid-portion 232. A plurality of take-up slots 241 have been punched or otherwise formed through the end portions 234 and 236. For example, generally open slots 247 having squared ends have been formed directly at the ends of the end portions 234 and 236. Also, captured slots 249 having rounded ends have been formed through the end portions 234 and 236 at locations slightly offset from the ends of the end portions 234 and 236. As shown in FIG. 8, the captured slots 249 do not overlap the open slots 247.

With regard to the foregoing description, it is to be understood that changes may be made in detail, especially in matters of the construction materials employed and the shape, size and arrangement of the parts without departing from the scope of the present invention. It is intended that the specification and depicted embodiments be considered illustrative only, with a true scope and spirit of the invention being indicated by the broad meaning of the following claims.

We claim:

1. A flexible pipe comprising:
 a) a pipe body that extends along a central longitudinal axis, the pipe body including a strip that is helically wrapped in a plurality of convolutions, the strip including inner and outer hook portions that interlock to form an interlock seam between adjacent convolutions;
 b) the pipe body including a mid-portion positioned between first and second end portions;
 c) at least the first end portion having an axial length $L_1$ that traverses at least several of the convolutions of the pipe body, the first end portion having an outer diameter $D_1$ that is defined along the axial length $L_1$;
 d) the mid-portion defining an outer diameter $D_2$;
 e) the first end portion being crushed radially inward relative to the mid-portion such that the outer diameter $D_1$ is smaller than the outer diameter $D_2$;
 f) the pipe body including a first transition region positioned between the first end portion and the mid-portion that provides a diameter transition between the outer diameter $D_1$ and the outer diameter $D_2$, the first transition region having an axial length $L_2$ that traverses at least one of the convolutions of the pipe body; and
 g) the first end portion having an exposed inner surface such that a pipe can be inserted within the first end portion and clamped directly against the inner surface to provide a lap joint.

2. The flexible pipe of claim 1, wherein the axial length $L_2$ of the first transition region traverses no more than 2 of the convolutions.

3. The flexible pipe of claim 1, wherein the first transition region has a frusto-conical shape.

4. The flexible pipe of claim 1, wherein the mid-portion is axially moveable between an axially expanded orientation and an axially compressed orientation, and the first end portion is permanently retained in an axially compressed orientation.

5. The flexible pipe of claim 1, wherein the second end portion has the same outer diameter $D_1$ and axial length $L_1$ as the first end portion, wherein a second transition region is portioned between the mid-portion and the second end portion for providing a gradual outer diameter transition between the outer diameter $D_2$ of the mid-portion and the outer diameter $D_1$ of the second end portion, the second transition region having the same axial length $L_2$ as the first transition region.

6. The flexible pipe of claim 1, wherein the first end portion is compressed such that interleaves of the interlocked first and second hook portions contact each other in a generally parallel relationship.

7. A flexible pipe comprising:
 a) a pipe body that extends along a central longitudinal axis, the pipe body including a strip that is helically wrapped in a plurality of convolutions, the strip including inner and outer hook portions that interlock to form an interlock seam between adjacent convolutions;
 b) the pipe body including a mid-portion positioned between first and second end portions;
 c) at least the first end portion having an axial length $L_1$ that traverses at least several of the convolutions of the pipe body, the first end portion having an outer diameter $D_1$ that is defined along the axial length $L_1$;
 d) the mid-portion defining an outer diameter $D_2$;
 e) the first end portion being crushed radially inward relative to the mid-portion such that the outer diameter $D_1$ is smaller than the outer diameter $D_2$; and f) the pipe body including a first transition region positioned between the first end portion and the mid-portion that provides a diameter transition between the outer diameter $D_1$ and the outer diameter $D_2$, the first transition region having an axial length $L_2$ that traverses at least one of the convolutions of the pipe body, wherein the pipe body defines a central opening, and wherein the pipe body includes a pipe stop that projects radially into the central opening adjacent to the first transition region.

8. The flexible pipe of claim 1, further comprising clamps mounted at the first and second end portions.

9. A flexible pipe comprising:
a) a pipe body that extends along a central longitudinal axis, the pipe body including a strip that is helically wrapped in a plurality of convolutions, the strip including inner and outer hook portions that interlock to form an interlock seam between adjacent convolutions;
b) the pipe body including a mid-portion positioned between first and second end portions;
c) at least the first end portion having an axial length $L_1$ that traverses at least several of the convolutions of the pipe body, the first end portion having an outer diameter $D_1$ that is defined along the axial length $L_1$;
d) the mid-portion defining an outer diameter $D_2$;
e) the first end portion being crushed radially inward relative to the mid-portion such that the outer diameter $D_1$ is smaller than the outer diameter $D_2$;
f) the pipe body including a first transition region positioned between the first end portion and the mid-portion that provides a diameter transition between the outer diameter $D_1$ and the outer diameter $D_2$, the first transition region having an axial length $L_2$ that traverses at least one of the convolutions of the pipe body; and
g) a compression indicator including a piece of tape secured to the mid-portion of the pipe body.

10. A flexible pipe comprising:
a) a pipe body that extends along a central longitudinal axis, the pipe body including a strip that is helically wrapped in a plurality of convolutions, the strip including inner and outer hook portions that interlock to form an interlock seam between adjacent convolutions;
b) the pipe body including a mid-portion positioned between first and second end portions;
c) at least the first end portion having an axial length $L_1$ that traverses at least several of the convolutions of the pipe body, the first end portion having an outer diameter $D_1$ that is defined along the axial length $L_1$;
d) the mid-portion defining an outer diameter $D_2$;
e) the first end portion being crushed radially inward relative to the mid-portion such that the outer diameter $D_1$ is smaller than the outer diameter $D_2$;
f) the pipe body including a first transition region positioned between the first end portion and the mid-portion that provides a diameter transition between the outer diameter $D_1$ and the outer diameter $D_2$, the first transition region having an axial length $L_2$ that traverses at least one of the convolutions of the pipe body; and
g) wherein the first end portion defines a plurality of take-up openings.

11. The flexible pipe of claim 10, wherein the take-up openings comprise open-ended slots.

12. A flexible pipe comprising:
a) a pipe body that extends along a central longitudinal axis, the pipe body including a strip that is helically wrapped in a plurality of convolutions, the strip including inner and outer hook portions that interlock to form an interlock seam between adjacent convolutions;
b) the pipe body including a mid-portion positioned between first and second end portions;
c) at least the first end portion having an axial length $L_1$ that traverses at least several of the convolutions of the pipe body, the first end portion having a wall thickness $T_1$ that is defined along the axial length $L_1$;
d) the mid-portion defining a wall thickness $T_2$ that is larger than the wall thickness $T_1$ of the first end portion;
e) the pipe body including a first transition region positioned between the first end portion and the mid-portion that provides a -wall thickness transition between the wall thickness $T_1$ and the wall thickness $T_2$, the first transition region having an axial length $L_2$ that traverses only one or two of the convolutions of the pipe body;
f) the interlocked inner and outer hook portions of the first end portion being radially compressed together such that no circumferential slippage is permitted between adjacent convolutions of the first end portion; and
g) the first end portion being oriented in a fully axially compressed orientation.

13. A flexible pipe comprising:
a) a pipe body that extends along a central longitudinal axis, the pipe body including a strip that is helically wrapped in a plurality of convolutions, the strip including inner and outer hook portions that interlock to form an interlock seam between adjacent convolutions;
b) the pipe body including a mid-portion positioned between first and second end portions;
c) at least the first end portion having an axial length $L_1$ that traverses at least several of the convolutions of the pipe body, the first end portion having an outer diameter $D_1$ that is defined along the axial length $L_1$;
d) the mid-portion defining an outer diameter $D_2$;
e) the first end portion being crushed radially inward relative to the mid-portion such that the outer diameter Di is smaller than the outer diameter $D_2$; and
f) the pipe body including a first transition region positioned between the first end portion and the mid-portion that provides a diameter transition between the outer diameter $D_1$ and the outer diameter $D_2$, the first transition region having an axial length $L_2$ that traverses between one and two of the convolutions of the pipe body.

14. A flexible pipe comprising:
a) a pipe body that extends along a central longitudinal axis, the pipe body including a strip that is helically wrapped in a plurality of convolutions, the strip including inner and outer hook portions that interlock to form an interlock seam between adjacent convolutions;
b) the pipe body including a mid-portion positioned between first and second end portions;
c) the first and second end portions each having an axial length $L_1$ that traverses at least several of the convolutions of the pipe body, the first and second end portions also having a wall thickness $T_1$ that is defined along the axial lengths $L_1$;
d) the mid-portion defining a wall thickness $T_2$ that is larger than the wall thickness $T_1$ of the first and second end portions;
e) the pipe body including transition regions positioned between the end portions and the mid-portion that provide wall thickness transitions between the wall thicknesses $T_1$ and the wall thickness $T_2$, the transition regions each having an axial length $L_2$ that traverses at least one of the convolutions of the pipe body; and f) the first and second end portions both having substantially the same inner diameter.

* * * * *

UNITED STATES PATENT AND TRADEMARK OFFICE
CERTIFICATE OF CORRECTION

PATENT NO.     : 6,508,277 B1
DATED          : January 21, 2003
INVENTOR(S)    : Imes et al.

It is certified that error appears in the above-identified patent and that said Letters Patent is hereby corrected as shown below:

Column 2,
Line 6, "It The various" should read -- The various --

Column 12,
Line 42, "Di is smaller" should read -- $D_1$ is smaller --

Signed and Sealed this

Tenth Day of June, 2003

JAMES E. ROGAN
*Director of the United States Patent and Trademark Office*